Patented Nov. 15, 1927.

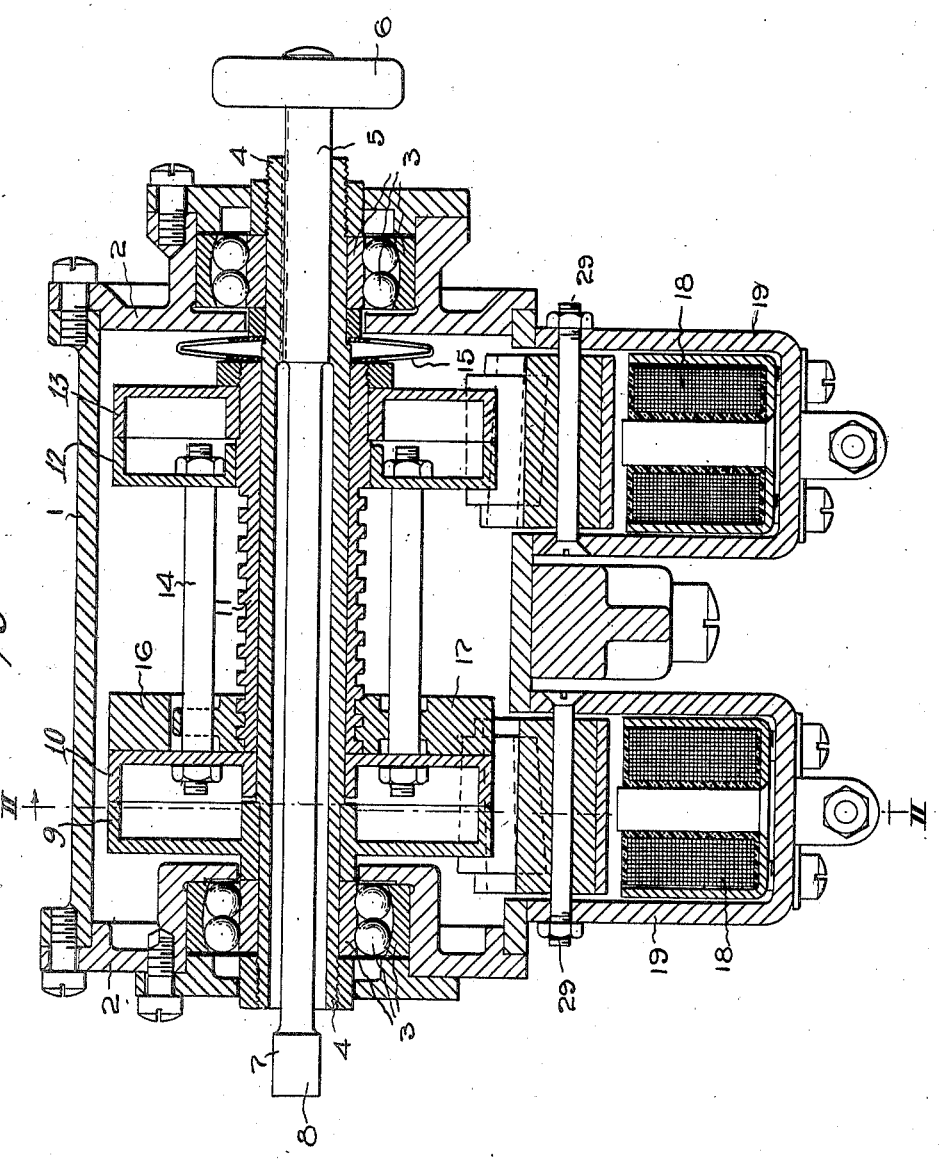

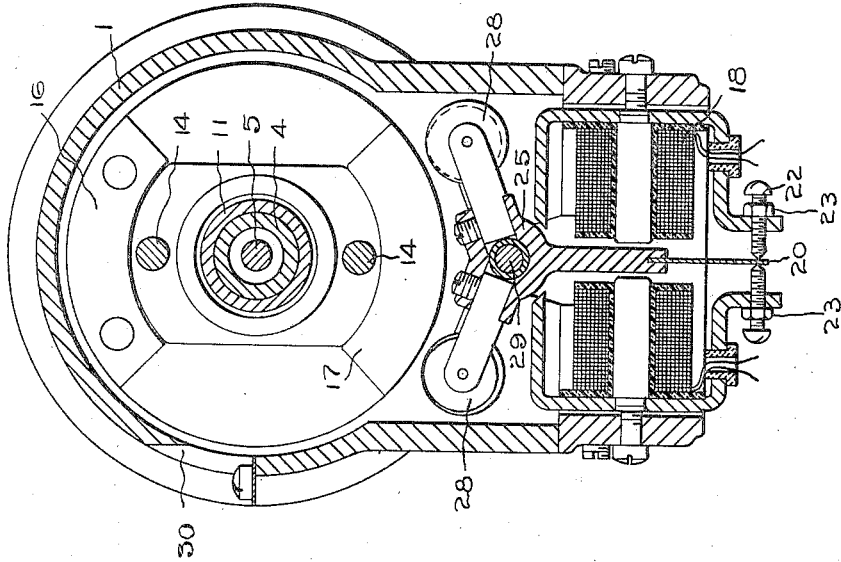
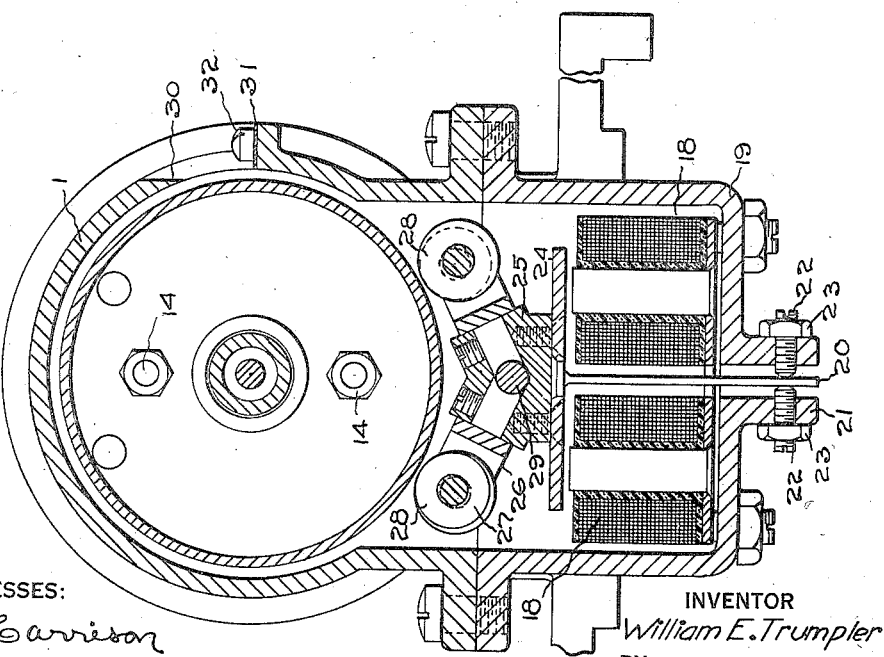

1,649,143

UNITED STATES PATENT OFFICE.

WILLIAM E. TRUMPLER, OF WILKINSBURG, PENNSYLVANIA, ASSIGNOR TO WESTINGHOUSE ELECTRIC & MANUFACTURING COMPANY, A CORPORATION OF PENNSYLVANIA.

BALANCING MACHINE.

Application filed July 11, 1924. Serial No. 725,352.

My invention relates to balancing machines, more particularly to counter-balancing mechanism utilized in balancing machines for dynamically balancing rotors and the like.

It is among the objects of my invention to provide a balancing mechanism which shall be of simple, compact and durable mechanical construction, which shall be adapted to be utilized in conjunction with standard types of balancing machines and which shall operate efficiently to determine the relative amount and location of "parasitic" or unbalanced masses in rotating bodies.

It is a further object of my invention to provide a counter-balancing mechanism of the above designated character which shall be semi-automatic in its operation and which shall be adjustable by a simple switch mechanism located on the support or stationary part of the balancing machine.

It is still a further object of my invention to provide a counter-balancing mechanism which shall greatly facilitate the balancing operations without interfering with the free vibration of the oscillatory bed member on which the rotor to be tested is journalled for rotation and which shall be conducive to the performance of a continuous balancing operation without interruption of the rotation of the body being tested.

Various types of balancing machines, for dynamically testing rotating bodies, some of which utilize counter-balancing mechanism to offset the parasite masses of the rotating body, have been proposed. In all the prior types utilizing such counter-balancing mechanism, the counter-balancing device is mounted on the oscillatory bed member which carries the rotating body, and the control members such as levers, hand wheels and the like, were likewise a part of the vibrating bed. In manipulating the counter-balancing mechanism for regulating the vibration of the bed, the handling of the control members necessarily interfered with the free vibration of the bed to the extent of entirely interrupting the balancing process until the necessary adjustments had been made.

My present invention is directed to a counter-balancing mechanism which obviates these difficulties in that the control means are mounted on the stationary member of the balancing mechanism and have been greatly simplified and reduced to a minimum number of control members which are readily manipulated from the main position of observation and operation that the operator assumes in running the balance test.

I utilize a plurality of electro-magnetic adjusting members which are controlled by an electrical circuit and operated by push-button switches. My balancing mechanism further includes novel means for producing a balancing couple by a pair of counter-balance weights which are angularly displaceable and axially movable relative to the rotating body to counteract the unbalanced masses which produce the dynamic unbalance thereof.

In the accompanying drawings constituting a part hereof and in which like reference characters designate like parts:

Figure 1 is a longitudinal sectional view of a counter-balancing mechanism embodying the principles of my invention.

Fig. 2 is a cross-sectional view thereof taken along the line II—II of Fig. 1, illustrating the actuating mechanism, and Fig. 3 is a view partially in cross section and partially in elevation, of the counter-balancing device embodying the counter-balance weights and having a modified form of magnet coil.

Referring to Fig. 1, the device therein illustrated comprises a cylindrical casing or housing 1 having a pair of end brackets 2 provided with central openings adapted to receive anti-friction bearings 3 for journalling a hollow sleeve or shaft 4 which extends longitudinally of the housing 1. A rod 5, having a hand wheel 6 on one end thereof and an expanded end portion 7 on its other end, is provided with a threaded opening 8 for effecting a screw thread engagement with a chuck or clamping member that secures the rotor to be tested.

A flanged disk 9 is securely mounted on the hollow shaft 4 and a similar disk 10 is rotatably mounted thereon in frictional engagement with the disk 9. A threaded sleeve member 11 is rotatably mounted on the hollow shaft 4 and a pair of friction disks 12 and 13 are mounted on the sleeve member 11, the disk 13 being rigidly mounted while the disk 12 is slidably mounted thereon. The disk members 10 and 12 are joined by bolts 14 to function as a unitary member, the bolts extending through openings provided in said disks. The members 10, 11, 12 and 13 are held in suitable spaced relation and are subjected to axial pressure by a spring 15 disposed between a shoulder of the shaft 4 and the end of the sleeve member 11. The spring 15 exerts pressure against the disk 9 to provide a sufficient amount of frictional contact with the disk member 10 whereby all of the disk and the sleeve elements will rotate as a unitary member.

A counter-balance weight 16 is secured to the disk 10, and a co-operating counter-weight 17, having a screw-threaded engagement with the sleeve member 11, is provided with openings to permit the bolts 14 to extend therethrough and thereby provide movement of the weight 17 on the threaded surface of the sleeve 11 in an axial direction.

Pairs of electromagnets 18 suitably housed in metal casings 19 are secured to the underside of the member 1, Figs. 1 and 2. The electromagnets are arranged in pairs as shown in Fig. 2, with a spring member 20 disposed therebetween. The spring is secured between a pair of depending lugs 21 of the casing 19 by a pair of adjustable set screws 22 having lock nuts 23.

Roller blocks 25 having yoke arms 26 provided with pins 27 for rotatably journalling rollers 28 are pivotally mounted by screw bolts 29 on the casings 19. The rollers 28 are so arranged that by energizing the electromagnets 18, the flux in the cores thereof draws the plates 24 in the direction of the coils which are energized to alternately engage the rollers 28 with the co-operating disks.

In Fig. 3, the magnets are disposed transversely of the springs 20 and the roller blocks 25 are of a special T-shape construction which extends between the magnet coils.

The casing 1 is cut away to provide an opening 30, Figs. 2 and 3, which exposes the operating mechanism inside, for the purpose of determining the location and positions of the counter-weights, which is accomplished by means of a vernier or graduated scale 31 that is secured to the housing 1 by screw bolts 32. The disks are provided with suitable markings to determine their angular position relative to the drive spindle for the purpose of marking the rotor, and the vernier 31 is provided with graduations to indicate the axial position of the counter-balance weight 17.

The casing 1 is clamped to a mounting bracket or saddle member 33 having recessed portions 34 by which it is adapted to be mounted on the support or bed member which is the vibratory portion of the balancing machine. This saddle is rigidly secured to the bed which is symmetrically balanced relative to the spring supports on which it is carried during the testing operation, the bed, rotor and counter balancing mechanism operating as a unit.

The operation of the device is briefly as follows: Referring to Fig. 1, the coils of electromagnets 18 are connected to a source of electrical energy and to a double-throw switch which functions to energize either of the pair of electromagnets shown in Fig. 2. The rod or spindle 5 being secured, one end to the rotor to be tested and keyed to the hollow shaft 4, the spindle shaft and disk members will rotate with the rotating body by virtue of the frictional engagement between the respective disks. With the fulcrum of the oscillatory bed in a given transverse plane of the rotor being tested, there will be an unbalanced mass in the rotating body which will impose an impulse force on the oscillatory bed member to cause it to vibrate or oscillate around the fulcrum point. The imposed force is the moment of inertia which is a measure of the unbalanced mass and its distance from the fulcrum point.

To bring the rotating body in dynamic balance, it is necessary to offset or counteract such unbalanced mass and this is accomplished by the counter-balance weights 16 and 17, the weights being so adjusted as to produce a couple in opposition to that of the mass.

The rotating elements of the counter-balancing mechanism are actuated by the drive mechanism which actuates the rotor or body being tested whereby the disk and counter-balance weights rotate simultaneously with the rotor secured to the end of the rod 5. The electromagnets 18 of the rollers 28 engaging the disks 12 and 13 are energized to effect engagement of the rollers 28 with the disks. The rollers 28 are tapered to provide different peripheral speeds of the contacting surface engaging the disk 12 and the disk 13 and in like manner the rollers engaging the disks 9 and 10 are tapered for the same purpose. When the rollers 28 co-operating with the disks 12 and 13 engage said disks, a creepage is effected between the disk members which are normally held in frictional engagement. The creepage produces angular displacement of the disks relative to each other because of the difference in the peripheral speeds of the contacting portions of the engaging rollers. The disk 13 being secured to the sleeve 11 and the disk 12 having a running fit therewith, causes the threaded sleeve 11 to rotate relative to the disk 12 which action effects axial movement of the counter-balance weight 17 thus producing a couple which counteracts the unbalance of the rotor. By engaging the rollers 28 with the disks 9 and 10, a similar angular displacement will be produced between the disks 9 and 10 and the counter-balance weight 16 secured to the latter.

The adjustment of the weights 16 and 17 is continued through the selective operation of the electromagnets which are successively energized until the oscillatory bed member comes to rest or reaches a minimum degree of vibration which is an indication that the counter-balance weights have been adjusted to counteract the unbalanced mass of the rotor being tested.

The machine is then brought to a standstill and readings are made on the scale 31 to determine the location of the counter-balance weight 17 which is an indication of the magnitude of the unbalanced mass and the relative angular displacement of the counter-balance weight 16 and the disk 9 is determined by the marking on the disk, such displacement being the angular position of the unbalance and the point in which correction for the unbalanced mass is to be made by the addition or removal of material to or from the rotor. The disk members may be graduated on their faces in thousandths of an inch or in degrees to obtain a very accurate reading. The rotor is then marked in accordance with the readings taken on the scale of the disks and it may be corrected either while on the machine or after removal to a more convenient place, such as a work bench or drill press.

If while making the adjustment of the counter-balance weights, the weights are adjusted beyond the point of minimum vibration of the oscillatory bed member, they may readily be actuated in a reverse direction by energizing the opposite electromagnet to effect engagement of the other roller 28 which is tapered in the opposite direction to that of the rollers originally in contact with the disk.

It is evident from the foregoing description of my invention that counter-balancing mechanism made in accordance therewith provides a simple and efficient means for determining the dynamic unbalance of rotors and further indicates the relative amount of the unbalanced mass and the angular location in which correction for such unbalanced mass is to be made. This mechanism entirely eliminates levers, wheels and other control mechanism heretofore employed whereby no interruption to the free vibration of the bed member is possible and a rotor may be tested for dynamic balance in a minimum period of time. Another feature of my counter-balancing mechanism is that it is actuated by the same driving means utilized for rotating the body to be tested.

Although I have described a specific embodiment of my invention it will be obvious to those skilled in the art that various modifications may be made in the details of construction and the design and proportion of the several co-operating parts without departing from the principles herein set forth.

I claim as my invention:—

1. A counterbalance mechanism comprising a shaft, a pair of movable weights mounted thereon, friction means for changing a shaft, a pair of movable weights and electromagnetic means for rendering said friction means operative.

2. A counterbalance mechanism comprising a shaft, a pair of movable weights mounted thereon, friction means for changing the relative angular and axial positions of said weights, and electromagnetic means for rendering said friction means operative.

3. A counterbalance mechanism comprising a hollow shaft, a spindle disposed therein and engaged at one end thereof, a plurality of friction discs mounted on said shaft, counterweights operatively connected to said discs, friction rollers adapted for engagement with said discs and electromagnetic means for engaging said rollers and disks.

4. A counterbalance mechanism comprising a hollow shaft, a spindle disposed therein and engaged at one end thereof, a plurality of friction disks mounted on said shaft, counterweights operatively connected to said disks, conical friction rollers adapted for engagement with said disks and electromagnetic means for engaging said rollers and disks.

5. A counterbalance mechanism comprising a hollow shaft, a spindle disposed therein and engaged at one end thereof, a plurality of friction discs mounted on said shaft, counterweights operatively connected to said disks, friction rollers adapted for engagement with said disks and means for effecting creepage between the respective disks.

6. A counterbalance mechanism comprising a hollow shaft, a spindle disposed therein having a spline connection with said shaft at one end thereof, a friction disk secured to said shaft, a co-operating disk rotatably mounted on said shaft, a threaded sleeve rotatably mounted on said shaft in axial alinement with said disks, a pair of co-operating disks one of which is rotatably mounted on said sleeve, a balance weight secured to one of said disks, a balance weight mounted on said sleeve having a threaded engagement therewith, means for interlocking two of said disks and means for effecting creepage between the respective disks.

7. A counterbalance mechanism comprising a hollow shaft, a spindle disposed therein having a spline connection with said shaft at one end thereof, a friction disk secured to said shaft, a co-operating disk rotatably mounted on said shaft, a threaded sleeve rotatably mounted on said shaft in axial alinement with said disks, a pair of co-operating disks one of which is rotatably mounted on said sleeve, a balance weight secured to one of said disks, a balance weight mounted on said sleeve having a threaded engagement therewith, means for interlocking two of said disks and electromagnetic means for effecting creepage between the respective disks.

8. A counterbalance mechanism comprising a hollow shaft, a spindle disposed therein having a spline connection with said shaft at one end thereof, a friction disk secured to said shaft, a co-operating disk rotatably mounted on said shaft, a threaded sleeve rotatably mounted on said shaft in axial alinement with said disks, a pair of co-operating disks one of which is secured to said sleeve, a balance weight mounted on said sleeve having a threaded engagement therewith, means for interlocking two of said disks, means for effecting angular movement of said weights relative to said shaft and spindle and means for effecting axial movement of one of said weights on the threaded sleeve member.

9. A counterbalance mechanism comprising a hollow shaft, a spindle disposed therein having a spline connection with said shaft at one end thereof, a friction disk secured to said shaft, a co-operating disk rotatably mounted on said shaft, a threaded sleeve rotatably mounted on said shaft in axial alinement with said disks, a pair of co-operating disks mounted on said sleeve, a balance weight secured to one of said disks, a balance weight mounted on said sleeve having a threaded engagement therewith, a plurality of bolts extending through said weights and secured to two of said disks, means for effecting angular movement of said weights relative to said shaft and spindle and means for effecting axial movement of one of said weights on the threaded sleeve member.

10. A counterbalance mechanism comprising a hollow shaft, a spindle disposed therein having a spline connection with said shaft at one end thereof, a friction disk secured to said shaft, a co-operating disk rotatably mounted on said shaft, a threaded sleeve rotatably mounted on said shaft in axial alinement with said disks, a pair of co-operating disks mounted on said sleeve, a balance weight secured to one of said disks, a balance weight mounted on said sleeve having a threaded engagement therewith, means for securing certain of said disks, means for effecting angular movement of said weights relative to said shaft and spindle, means for effecting axial movement of one of said weights on the threaded sleeve member, a plurality of conical friction rollers in co-operative alinement with said disks and electromagnetic means for engaging said rollers and disks.

11. A counterbalance mechanism comprising a hollow shaft, a spindle disposed therein having a spline connection with said shaft at one end thereof, a friction disk secured to said shaft, a co-operating disk rotatably mounted on said shaft, a threaded sleeve rotatably mounted on said shaft in axial alinement with said disks, a pair of co-operating disks rotatably mounted on said sleeve, a balance weight secured to one of said disks, a balance weight mounted on said sleeve having a threaded engagement therewith, a plurality of bolts securing some of said disks, spring pressure means to provide frictional contacts between some of said disks, means for effecting angular movement of said weights relative to said shaft and spindle, means for effecting axial movement of one of said weights on the threaded sleeve member, a plurality of conical friction rollers in co-operative alinement with said disks and electromagnetic means for engaging said rollers and disks.

12. A counterbalance mechanism comprising a hollow shaft journalled for rotation in a cylindrical housing, a threaded sleeve rotatably mounted on said shaft, a pair of similar disks mounted on said sleeve, bolts connecting the proximate disks of said pair of disks, a counterweight secured to one of said disks, a counterweight having a screw thread engagement with said sleeve, a spring disposed between one of the outside disks and the housing, a plurality of conical friction rollers mounted in working alinement to said disks, and a plurality of electromagnets secured to said housing, said electromagnets being adapted to effect engagement of said rollers and disks.

In testimony whereof, I have hereunto subscribed my name this 8th day of July, 1924.

WILLIAM E. TRUMPLER.

CERTIFICATE OF CORRECTION.

Patent No. 1,649,143.  Granted November 15, 1927, to

WILLIAM E. TRUMPLER.

It is hereby certified that error appears in the printed specification of the above numbered patent requiring correction as follows: Page 3, line 70, claim 1, strike out the words "a shaft, a pair of movable weights" and insert instead "the relative positions of said weights"; and that the said Letters Patent should be read with this correction therein that the same may conform to the record of the case in the Patent Office.

Signed and sealed this 7th day of February, A. D. 1928.

Seal.

M. J. Moore,
Acting Commissioner of Patents.